(12) United States Patent
Derza (10) Patent No.: US 11,763,366 B1
(45) Date of Patent: Sep. 19, 2023

(54) AUTOMATIC INITIALIZATION OF CUSTOMER ASSISTANCE BASED ON COMPUTER VISION ANALYSIS

(71) Applicant: WALGREEN CO., Deerfield, IL (US)

(72) Inventor: Oliver Derza, Willowbrook, IL (US)

(73) Assignee: WALGREEN CO., Deerfield, IL (US)

( * ) Notice: Subject to any disclaimer, the term of this patent is extended or adjusted under 35 U.S.C. 154(b) by 489 days.

(21) Appl. No.: 16/892,441

(22) Filed: Jun. 4, 2020

(51) Int. Cl.
| | |
|---|---|
| *G06Q 30/0601* | (2023.01) |
| *G06Q 20/18* | (2012.01) |
| *G06N 20/00* | (2019.01) |
| *G06N 5/04* | (2023.01) |
| *G06T 7/20* | (2017.01) |
| *G06T 7/70* | (2017.01) |
| *G06F 3/14* | (2006.01) |
| *B64C 39/02* | (2023.01) |
| *G06Q 30/02* | (2023.01) |
| *G06V 40/20* | (2022.01) |

(Continued)

(52) U.S. Cl.
CPC ....... *G06Q 30/0613* (2013.01); *B64C 39/024* (2013.01); *G06F 3/14* (2013.01); *G06F 18/214* (2023.01); *G06N 5/04* (2013.01); *G06N 20/00* (2019.01); *G06Q 20/18* (2013.01); *G06Q 30/0281* (2013.01); *G06T 7/20* (2013.01); *G06T 7/70* (2017.01); *G06V 40/20* (2022.01); *B64U 2101/00* (2023.01); *G06T 2207/10016* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 11,157,907 B1* | 10/2021 | Kumar | G06Q 20/308 |
| 2010/0262517 A1* | 10/2010 | Woods | G06Q 30/0603 |
| | | | 705/26.1 |

(Continued)

OTHER PUBLICATIONS

U.S. Appl. No. 15/189,628, "System and Method for Anticipating Mobile Device User Needs Using Wireless Communications Devices at an Entity Location," filed Jun. 22, 2016.

(Continued)

*Primary Examiner* — Santiago Garcia
(74) *Attorney, Agent, or Firm* — MARSHALL, GERSTEIN & BORUN LLP; Randall G. Rueth (57) ABSTRACT

Techniques for automatically initializing customer assistance in a retail store based on video analysis are provided. An exemplary method includes collecting training data including historical video data and training a computer vision model using the training data to identify at least one customer movement associated with customers in need of assistance. The method also includes receiving video data of a customer in a retail store, the video data captured by a camera, and applying the computer vision model to the video data to determine whether the customer has performed the at least one customer movement. The method still further includes, in response to determining that the customer has performed the at least one customer movement, determining the customer is in need of assistance and engaging the customer using at least one computing device.

19 Claims, 5 Drawing Sheets

(51) Int. Cl.
*G06F 18/214* (2023.01)
*B64U 101/00* (2023.01)

(56) References Cited

U.S. PATENT DOCUMENTS

| | | | | |
|---|---|---|---|---|
| 2013/0073336 | A1* | 3/2013 | Heath | G06Q 30/02 705/7.29 |
| 2013/0268316 | A1* | 10/2013 | Moock | G06Q 30/0201 705/7.29 |
| 2014/0279294 | A1* | 9/2014 | Field-Darragh | G06Q 30/0282 705/28 |
| 2015/0326692 | A1* | 11/2015 | Kaneko | H04L 63/061 709/217 |
| 2016/0258762 | A1* | 9/2016 | Taylor | G05D 1/0061 |
| 2017/0024679 | A1* | 1/2017 | Lee | H04L 65/1069 |
| 2017/0193506 | A1* | 7/2017 | Karnati | G06Q 30/0251 |
| 2018/0082314 | A1* | 3/2018 | Faith | G06V 40/172 |
| 2018/0241930 | A1* | 8/2018 | Eisses | G06N 20/00 |
| 2019/0279182 | A1* | 9/2019 | Rheault | G07F 9/009 |
| 2020/0357032 | A1* | 11/2020 | Watanabe | G06F 16/2455 |
| 2021/0103966 | A1* | 4/2021 | Cummings | G07G 1/009 |
| 2021/0342856 | A1* | 11/2021 | Watanabe | G06Q 30/06 |
| 2022/0027952 | A1* | 1/2022 | Dietrich | H04W 4/029 |

OTHER PUBLICATIONS

Blue Frog Robotics Inc., "Buddy The Emotional Robot", Retrieved from the Internet at: <URL:https://buddytherobot.com/en/buddy-the-emotional-robot/> (2020).

U.S. Appl. No. 15/189,628, filed Jun. 22, 2016, Eby et al., System and Method for Anticipating Mobile Device User Needs Using Wireless Communications Devices at an Entity Location.

* cited by examiner

AUTOMATIC INITIALIZATION OF CUSTOMER ASSISTANCE BASED ON COMPUTER VISION ANALYSIS

TECHNICAL FIELD

This disclosure relates to technologies for monitoring a store environment, and, more particularly, to technologies for automatically initializing customer assistance based on video analysis.

BACKGROUND

The background description provided herein is for the purpose of generally presenting the context of the disclosure. Work of the presently named inventors, to the extent it is described in the background section, as well as aspects of the description that may not otherwise qualify as prior art at the time of filing, are neither expressly nor impliedly admitted as prior art against the present disclosure.

Customers often require assistance when shopping in a retail store. For example, a customer may need an employee's assistance to access products that are within a locked case or otherwise out of reach. Customers may also be looking for an item that is out of stock, or in need of information regarding one or more items. However, customers may not know how to contact an employee or a store customer assistance system, for example, or know how to contact an employee for assistance, but are unable to do so and/or tried to do so without success. As a result, customers may become increasingly frustrated while trying to locate assistance, while employees and/or store customer assistance systems are not aware that the customer requires help, resulting in a loss of sales for the retail store. Accordingly, there is a need for systems and methods that can identify customers in need of assistance and automatically initialize a customer service action.

SUMMARY

Generally speaking, the present disclosure provides technologies for automatically initializing customer assistance based on video analysis. In accordance with one exemplary aspect of the present disclosure, a method for automatically initializing customer assistance in a retail store based on video analysis is provided. The method may be performed by one or more processors and includes collecting training data including historical video data and training a computer vision model using the training data to identify at least one customer movement associated with customers in need of assistance. The method also includes receiving video data of a customer in a retail store, the video data captured by a camera, and applying the computer vision model to the video data to determine whether the customer has performed the at least one customer movement. Further, the method includes, in response to determining that the customer has performed the at least one customer movement, determining the customer is in need of assistance and engaging the customer using at least one computing device.

In accordance with another exemplary aspect of the present disclosure, a system is provided including at least one computing device, one or more processors, and one or more memories. The one or more memories store instructions that, when executed by the one or more processors, cause the one or more processors to: collect training data including historical video data; train a computer vision model using the training data to identify at least one customer movement associated with customers in need of assistance; receive video data of a customer in a retail store captured by a camera; apply the computer vision model to the video data of the customer to determine whether the customer has performed the at least one customer movement; in response to determining that the customer has performed the at least one customer movement, determine the customer is in need of assistance; and engage the customer using the at least one computing device.

In accordance with another exemplary aspect of the disclosure, another method for automatically initializing customer assistance in a retail store based on video analysis is provided. The method may be performed by one or more processors and includes determining at least one customer movement associated with customers in need of assistance. The method also includes receiving video data of a customer in a retail store captured by a camera and analyzing the video data to determine whether the customer has performed the at least one customer movement. The method further includes, in response to determining that the customer has performed the at least one customer movement, determining the customer is need of assistance and engaging the customer using at least one computing device.

In some embodiments, determining the at least one customer movement includes collecting training data including historical video data and training a computer vision model using the training data to identify the at least one customer movement associated with the customers in need of assistance. Analyzing the video data may include applying the computer vision model to the video data of the customer to determine whether the customer has performed the at least one customer movement. Determining the at least one customer movement may include, for example, identifying at least one of a body location pattern or a facial movement associated with customers in need of assistance.

In various embodiments, training the computer vision model to identify the at least one customer movement includes training the computer vision model to identify a body location pattern associated with customers in need of assistance. The body location pattern may include at least one of: (i) remaining in aisle of a store for more than a predetermined amount of time, (ii) remaining in a position of a store for more than a predetermined amount of time, (iii) leaving an aisle of a store and returning to the aisle, or (iv) pacing within an aisle of a store for more than a predetermined amount of time.

Additionally or alternatively, training the computer vision model to identify the at least one customer movement can include training the computer vision model to identify a facial movement associated with customers in need of assistance. Training the computer vision model to identify the facial movement may include training the computer vision model to recognize an eye gaze movement. The eye gaze movement may include at least one of: (i) gazing at a location for more than a predetermined amount of time, (ii) gazing between two locations for more than a predetermined amount of time, (iii) gazing at a location where a product is out of stock, or (iv) gazing between a first location associated with a first product of an inventory category and a second location associated with a second product of the inventory category.

In various embodiments, engaging the customer using the at least one computing device includes one or more of: (i) transmitting a notification to a retail store computing device indicting the customer is in need of assistance, or (ii) displaying information on a display of an in-store computing device, the information tailored to the customer in need of assistance. Transmitting the notification to the retail store computing device may include, for example, transmitting a notification to a mobile device of an employee of the retail store. Displaying the information on the display of the in-store computing device may include, for example, displaying the information on the display of an in-store kiosk. In some embodiments, engaging the customer using the at least one computing device includes causing a drone including a display to (i) move to a location near the customer and (ii) display information tailored to the customer in need of assistance.

In some embodiments, the method may also include receiving inventory data of the retail store and correlating the video data to the inventory data to determine one or more products associated with the customer in need of assistance.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawing arrangements which are presently discussed, it being understood, however, that the present examples are not limited to the precise arrangements and instrumentalities shown, wherein.

DETAILED DESCRIPTION

Generally, methods and systems for automatically initializing customer assistance based on video analysis are disclosed. A computer system may determine one or more customer movements that customers in need of assistance generally perform. For example, in some embodiments, a computer vision model may be trained using historical video data to identify such customer movements. In some embodiments, the computer vision model may utilize a rules-based approach, in addition to or instead of a machine learning approach, to identify customer movements indicating that a customer requires assistance. The computer system can analyze video data of a customer within a retail store, for example, by applying the computer vision model, to determine whether the customer has performed a customer movement associated with customers in need of assistance.

In response to determining that a customer in the retail store has performed a customer movement associated with customers in need of assistance, the computer system identifies the customer as a customer in need of assistance, and automatically engages the customer using a computing device. For example, the computer system may transmit a notification to a computing device of an employee indicating that the customer requires assistance. In addition or alternatively, the computer system may transmit a notification to a kiosk near the customer's location, and the kiosk may display information tailored to assist the customer.

The systems and methods of the present disclosure offer numerous benefits. For example, a computer vision model may be built to identify customer behaviors and movements that customers in need of assistance perform. The built model can then be applied to video data, in real time, to identify current customers that perform such movements. This, in effect, improves the in-store experience for customers, as a store system can automatically react to the identification by transmitting a notification to an employee device or to a kiosk near the customer's location, decreasing the risk of a loss of a sale for the store system as well.

In addition to improving customer experience, the systems and methods of the present disclosure also improve in-store monitoring technologies. For example, as discussed in further detail below, the disclosed systems and methods may include gathering new video data within the store and/or linking video captured by security systems within a store to a computer system for providing customer assistance, thereby leveraging the security system video in a novel way. The methods include capturing video data and analyzing the video data in real-time to identify customers that currently need assistance. The techniques can also include identifying hazardous conditions within the store depicted in the video data, and initiating a corrective action in response, such as notifying an employee. Thus, the systems and methods of the present disclosure: (i) monitor the store environment, (ii) automatically identify customers that require help, and (iii) automatically engage the customers more quickly, efficiently, and effectively than traditional customer assistance and/or monitoring technologies.

Moreover, the systems and methods of the present disclosure do not merely automate manual tasks using a computer. Rather, the systems and methods monitor a store environment and engage a customer in ways different from human in-person monitoring. For example, some embodiments include building a computer vision model that identifies customer movements associated with customers in need of assistance, a new structure that previously would not be created or envisioned by a human. Embodiments also include analyzing video data to identify particular movements associated with customers need of assistance, for example, by applying the computer vision model, which a human would not be capable of performing. Further, a human also would not engage a customer by transmitting a notification to an employee device or a kiosk, which then displays the notification.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

Figure 1:
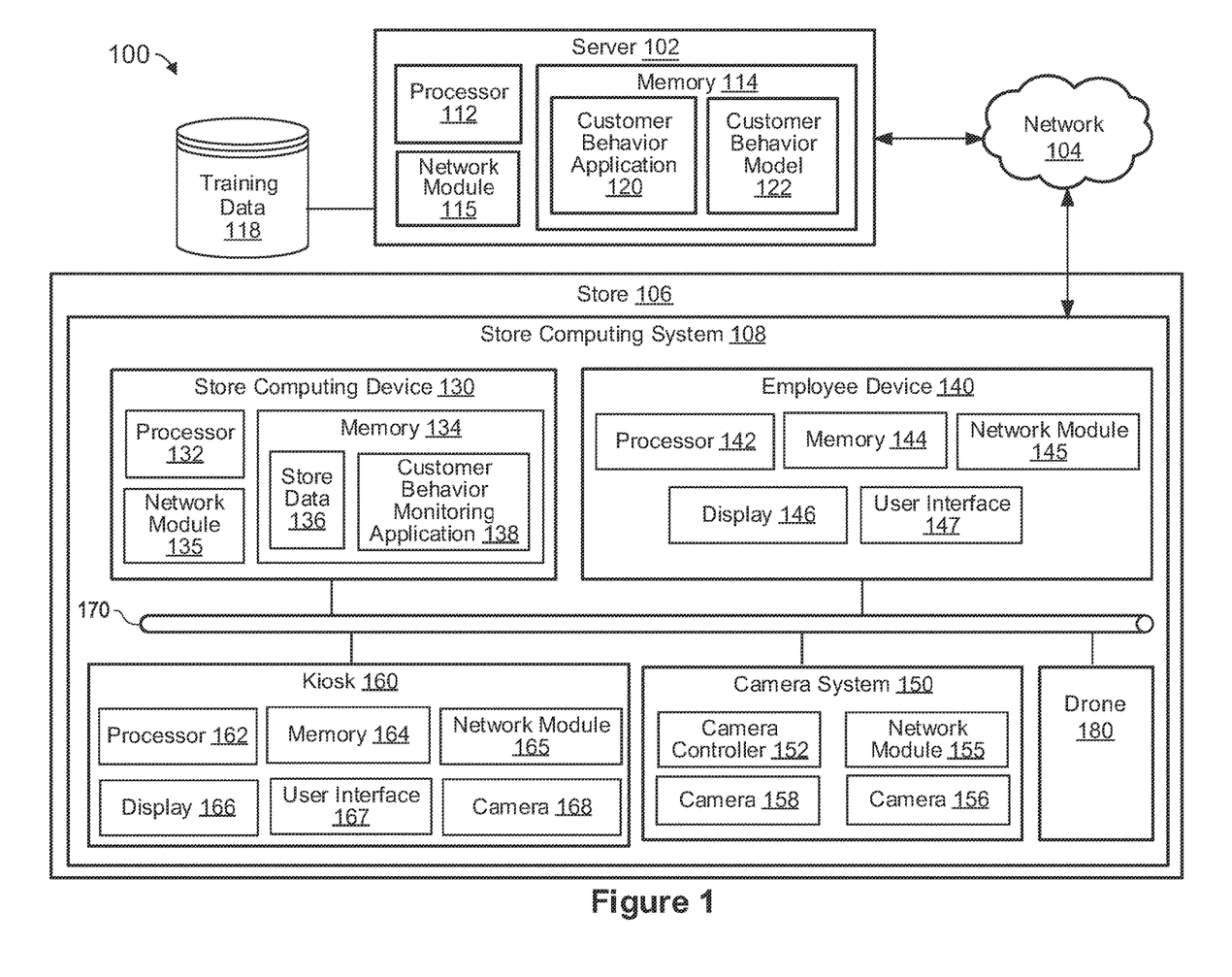
FIG. 1 illustrates an exemplary system in which techniques for analyzing video data and automatically initializing customer assistance based on the video analysis may be implemented, in accordance with some embodiments.

Turning now to the drawings, FIG. 1 illustrates an exemplary system 100 for automatically initializing customer assistance in a retail store based on video analysis. The system 100 analyzes video data and automatically initializes customer assistance based on the video analysis, for example, and as explained more below. The exemplary system 100 may include a server 102 and a store computing system 108. All or part of the store computing system 108 may be included within a store 106, which may be a retail store and/or a pharmacy, for example. As will be appreciated, the store 106 may include any alternative store other than a retail store or a pharmacy and still fall within the scope of the present disclosure. The server 102 may be located within the store 106 or in any remote, external location, as depicted in FIG. 1. The server 102 may communicate with the store computing system 108 (e.g., with one or more elements of the store computing system 108) via a network 104, such as a wireless network. The network 104 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMax, Wi-Fi, Bluetooth, and others). While FIG. 1 depicts only one network 104, the server 102 and the store computing system 108 may additionally or alternatively communicate via a plurality of networks, depending on the implementation, and still fall within the scope of the present disclosure. For example, the network 104 may include any one or more of an Ethernet-based network, a private network, a cellular network, a local area network (LAN), and/or a wide area network (WAN), such as the Internet.

The server 102 may include a network module 115 configured to communicate data via the network 104. The network module 115 may include one or more transceivers (e.g., WWAN, WLAN, and/or WPAN transceivers) functioning in accordance with IEEE standards, 3GPP standards, or other standards, and configured to receive and transmit data via one or more external ports. In addition, the server 102 includes one or more general purpose (e.g., CPUs) and/or special purpose processor(s) 112 and a memory 114. The memory 114 may be a non-transitory memory and can include one or several suitable memory modules, such as random access memory (RAM), read-only memory (ROM), flash memory, or other types of persistent memory, etc. The memory 114 can store instructions executable on the processor 112.

The memory 114 may store a customer behavior application 120 and a customer behavior model 122. Generally speaking, the customer behavior application 120 may obtain video data from the store computing system 108 and/or historical video data from a database 118 and use this video data to train and/or operate the customer behavior model 122.

In some embodiments, the customer behavior model 122 is a computer vision model (e.g., a computer model that analyzes images and/or video to extract information and/or perform various functions based on the analysis) that is trained using machine learning techniques, such as neural network techniques and deep learning. The customer behavior application 120 may use training data from the database 118 and/or video data from the store computing system 108 to train a customer behavior model 122 to identify customer movements and/or behaviors that indicate the customer requires assistance, as will be discussed with reference to FIG. 3.

As mentioned previously, training data used to train the customer behavior model 122 may be stored in the database 118. The training data may include historical video data depicting people engaging in various behaviors. The historical video data may depict customers and may have been captured by cameras within retail stores, which may or may not include the store 106. For example, the server 102 may be associated with the store 106, an entity that owns and/or manages a set of retail locations including the store 106, or another entity separate from the store 106 and/or a set of retail locations including the store 106. The training data may be collected at the database 118 from these retail locations and/or any other entity, such as the entities described. Video data captured by cameras in the store 106 may be stored in the database 118, and used to train the customer behavior model 122. The video data in the database 118 may be unprocessed or may be processed by an image processing algorithm that extracts features from the unprocessed video data. The extracted features may vary in granularity. For example, the features may correspond to identifications of pixels containing edges and lines within the video data, or may correspond to identifications of larger shapes within the images, such as bodies or individual body parts. The database 118 may utilize any known database architecture. Further, the database 118 may be implemented using cloud technology and may reside on a distributed network of computing devices rather than a single computing device.

In some embodiments, the customer behavior model 122 is a computer vision model that uses image analysis techniques to analyze video data from the store computing system 108, but is not trained using historical video data. For example, the customer behavior model 122 may be configured to identify features of the video data. The customer behavior model 122 may apply rules to the identified features to determine whether the features are associated with customers in need of assistance. For instance, a rule may indicate to the customer behavior model 122 that a certain group of features identified from video data including a customer's face indicate that the customer is frustrated, and may require assistance.

The customer behavior application 120 may apply the customer behavior model 122 to video data from the store computing system 108 to determine whether any customers that the video depicts have performed (or are currently performing, or have performed for or within a predetermined amount of time, such as a threshold time period, e.g., within the last 5, 10, 30, or 60 seconds, etc.), one or more movements associated with customers in need of assistance.

If the customer behavior model 122 identifies that customers have performed such movements for a predetermined period of time (or identifies any other anomalous condition based on the video data, such as a liquid spill in an aisle of the store 106, as discussed in more detail with reference to FIG. 3), the customer behavior application 120 may generate and/or transmit notifications or alerts to the store computing system 108.

The store computing system 108 includes a store computing device 130, an employee device 140, a camera system 150, and a kiosk 160. In another example, the store computing device 130 may also include a drone 180, as depicted in FIG. 1 and explained more below. Each of the store computing device 130, the employee device 140, the camera system 150, the kiosk 160, and the drone 180 may communicate via a store network 170, which may include a data bus and/or one or more wired or wireless networks. For example, the store network 170 may include one or more of an Ethernet based network, a private network, a cellular network, and/or a wide area network (WAN), such as the Internet. Each of the store computing device 130, the employee device 140, the camera system 150, and the kiosk may include a network module (the network modules 135, 145, 155, and 165, respectively) configured to communicate data via the network 104 and the store network 170, similar to the network module 115. While not depicted in FIG. 1, the drone 180 may also include a network module, similar to the network module 115, configured to communicate data via the network 104 and/or the store network 170.

The store computing device 130 may function as a central computing device of the store computing system 108 and may be, for example, a server, or multiple servers. The server 102, for example, may communicate directly with the employee device 140, the camera system 150, the kiosk 160, and the drone 180 via the network 104 and/or the store network 170, or the server 102 may communicate with the store computing device 130, which then may communicate with the other elements of the store computing system 108. In some embodiments, the store computing device 130 may implement some or all of the functionality of the server 102. In such embodiments, the store computing device 130 may implement the customer behavior application 120 and may store all or part of the customer behavior model 122. For example, the store computing device 130 may store a local version of the customer behavior model 122 received from the server 102, and may apply the local version to video data to identify customers in need of assistance.

The store computing device 130 includes one or more general purpose (e.g., CPUs) and/or special purpose processor(s) 132 and a memory 134. The memory 134 may be a non-transitory memory and can include one or several suitable memory modules, such as random access memory (RAM), read-only memory (ROM), flash memory, or other types of persistent memory, etc. The memory 134 can store instructions executable on the processor 132.

The memory 132 may store a customer behavior monitoring application 138 configured to support the techniques disclosed herein. The customer behavior monitoring application 138 may function as an intermediary between the store computing system 108 and the server 102. For example, the customer behavior monitoring application 138 may receive notifications and/or messages transmitted by the server 102, and may in turn transmit notifications and/or messages to the employee device 140, the kiosk 160, and/or the drone 180. The customer behavior monitoring application 138 also may also communicate data received from the employee device 140, the camera system 150, the drone 180, and/or the kiosk 160, and transmit such data to the server 102. In some embodiments, the employee device 140, the camera system 150, the kiosk 160, and the drone 180 may communicate directly with the server 102.

The memory 134 may also include store data 136 relating to the store 106. For example, the store data 136 may include inventory data indicative of the inventory of the store 106. The inventory data may include locations of products within the store (e.g., aisle location, shelf location, etc.), information relating to product availability (e.g., a number of products in the store, an indication of whether a product is out of stock, whether a product or a similar product is available to purchase online or in another store, etc.), and information relating to the product (e.g., product name, product description, sales and/or coupons relating to the product, similar products and/or product alternatives, advertisement materials related to the product or similar products). The store data 136 may also include information concerning the store layout, such as the locations of entrances and/or exits, aisles, endcaps, the kiosk 160, the cameras 156-158, etc. In some implementations, the server 102 may also include the store data 136, and the customer behavior model 122 may incorporate the store data in performing its video analysis.

As further depicted in FIG. 1, the store computing system 108 also includes at least one employee device 140 communicably coupled to the store computing device 130, for example, via the store network 170 and/or another network 104. While a single employee device 140 is depicted, it will be understood that the store computing system 108 may include multiple employee devices and still fall within the scope of the present disclosure. The employee device 140 may be any electronic device capable of receiving and transmitting messages via the store network 170 and/or the network 104. For example, the employee device 140 may be, for example, a personal computer, a portable or mobile device such as a tablet computer or smartphone, a wearable computing device such as smart watch, etc.

In addition to the network module 145, the employee device 140 includes one or more general purpose (e.g., CPUs) and/or special purpose processor(s) 142 and a memory 144. The memory 144 may be a non-transitory memory and can include one or several suitable memory modules, such as random access memory (RAM), read-only memory (ROM), flash memory, or other types of persistent memory, etc. The memory 144 can store instructions executable on the processor 142.

The employee device 140 may also include a display 146. The processor 142 may communicate with the display 146 to cause the display 146 to display notifications and/or alerts. In addition, the employee device 140 may include other output devices not depicted in FIG. 1, such as a speaker, haptic device, or light emitting device, configured to communicate notifications and/or alerts to a user. The employee device 140 may include a user interface 147, such as a mouse, keyboard or keypad, touch pad, click wheel, microphone, etc. configured to capture input from a user. In an embodiment, at least portions of the display 146 and the user interface 147 are combined in a single, integral device, e.g., a touch screen.

Still referring to FIG. 1, and as noted above, the store computing system 108 may also include at least one drone 180 communicably coupled to the store computing device 130, for example, via the store network 170 and/or another network 104. While a single drone 180 is depicted, it will be understood that the store computing system 108 may include multiple drones 180 and still fall within the scope of the present disclosure. The drone 180 may be a mobile robot capable of traversing the store 106 autonomously. The drone 180 may move to locations within the store 106 in accordance with commands received from other elements of the store computing system 108 (e.g., the kiosk 160, the employee device 140, or the store computing device 130) or the server 102. The drone 180 may include one or more processors, a memory, a display, output devices, and a user interface, which may be similar to the processor(s) 142, memory 144, display 146, other output devices, and user interface 147, respectively, of the employee device 140. For example, the drone 180 may include a display that presents notifications and/or alerts to users, such as customers or employees. The display may be a touch screen that a customer or employee may interact with. Further, the drone 180 may include a camera capable of gathering video data of customers within the store and/or store condition. The drone camera may be, for example, similar to a camera 168 discussed below with respect to the kiosk 160.

The drone 180 may remain at a particular location in the store 106 until receiving commands from the store computing system 108 and/or the server 102. In some implementations, each aisle of the store 106 may include a drone, such as the drone 180, that is assigned to the aisle. Additionally or alternatively, the drone 180 may move throughout the store 106, and may move to a particular location in the store to return to a charging station, for example.

As further depicted in FIG. 1, the store computing system 108 may also include the camera system 150 that is communicably coupled to one or more of the store computing device 130, the drone 180, and the employee device 140 via the store network 170 and/or the network 104. The camera system 150 includes cameras, such as a camera 156 and a camera 158, configured to capture image and/or video of the environment within the store 106. A camera controller 152 may be communicatively connected to the cameras 156-158 and configured to control the cameras 156-158 and/or modify settings of the cameras 156-158. For example, the camera controller 152 may cause the cameras 156-158 to begin capturing video data, tilt or pan, and/or transmit captured video data to the store computing device 130 and/or the server 102. The camera system 150 may be, or may be part of, a security camera system in the store 106.

Each of cameras 156 and 158 may be mounted in different locations in the store 106. The camera 156, for example, may be attached to a ceiling, wall, or shelving unit of the store 106. While FIG. 1 depicts two cameras, the cameras 156-158, the camera system 150 may include more than two cameras. One or more cameras may be located in different areas to capture suitable views of the interior of the store 106. For example, one or more cameras may be configured to capture views of a store entrance, a store exit, a check-out area, a pharmacy area, a beauty department, a grocery department, etc. In addition to conventional image and/or video data, the cameras 156-158 may include 3D scanners or laser scanners configured to collect laser-derived images and/or videos, as in a LIDAR system, and or any other camera capable of collecting and/or displaying video data, for example.

Still referring to FIG. 1, the store computing system 108 also includes the kiosk 160 communicably coupled to one or more of the store computing device 130, the employee device 140, the drone 180, and/or the camera system 150 via one or more of the store network 170 or network 104. While FIG. 1 illustrates a single kiosk 160, it will be understood that the store computing system 108 may include multiple kiosks. In addition to the network module 165, the kiosk 160 includes one or more general purpose (e.g., CPUs) and/or special purpose processor(s) 162 and a memory 164. The memory 164 may be a non-transitory memory and can include one or several suitable memory modules, such as random access memory (RAM), read-only memory (ROM), flash memory, or other types of persistent memory, etc. The memory 164 can store instructions executable on the processor 162.

The kiosk 160 may also include a display 166. The processor 162 may communicate with the display 166 to cause the display 166 to display notifications and/or alerts. In addition, the kiosk 160 may include other output devices not depicted in FIG. 1, such as a speaker, haptic device, or light emitting device, configured to communicate notifications and/or alerts to a user. The kiosk 160 may include a user interface 167, such as a mouse, keyboard or keypad, touch pad, click wheel, microphone, etc. configured to capture input from a user. In an embodiment, at least portions of the display 166 and the user interface 167 are combined in a single, integral device, e.g., a touch screen.

The kiosk 160 may also include a camera 168. The camera 168 may receive instructions from the processor 162 and/or may be communicatively coupled to the camera controller 152 and part of the camera system 150. The camera 168 may capture image and/or video data, and the kiosk 160 may transmit the image and/or video data to the store computing device 130 and/or the server 102. In addition to conventional image and/or video data, the camera 168 may include 3D scanners or laser scanners configured to collect laser-derived images and/or videos, as in a LIDAR system. Additional details regarding the kiosk 160 are discussed below with reference to FIG. 2.

Figure 2:
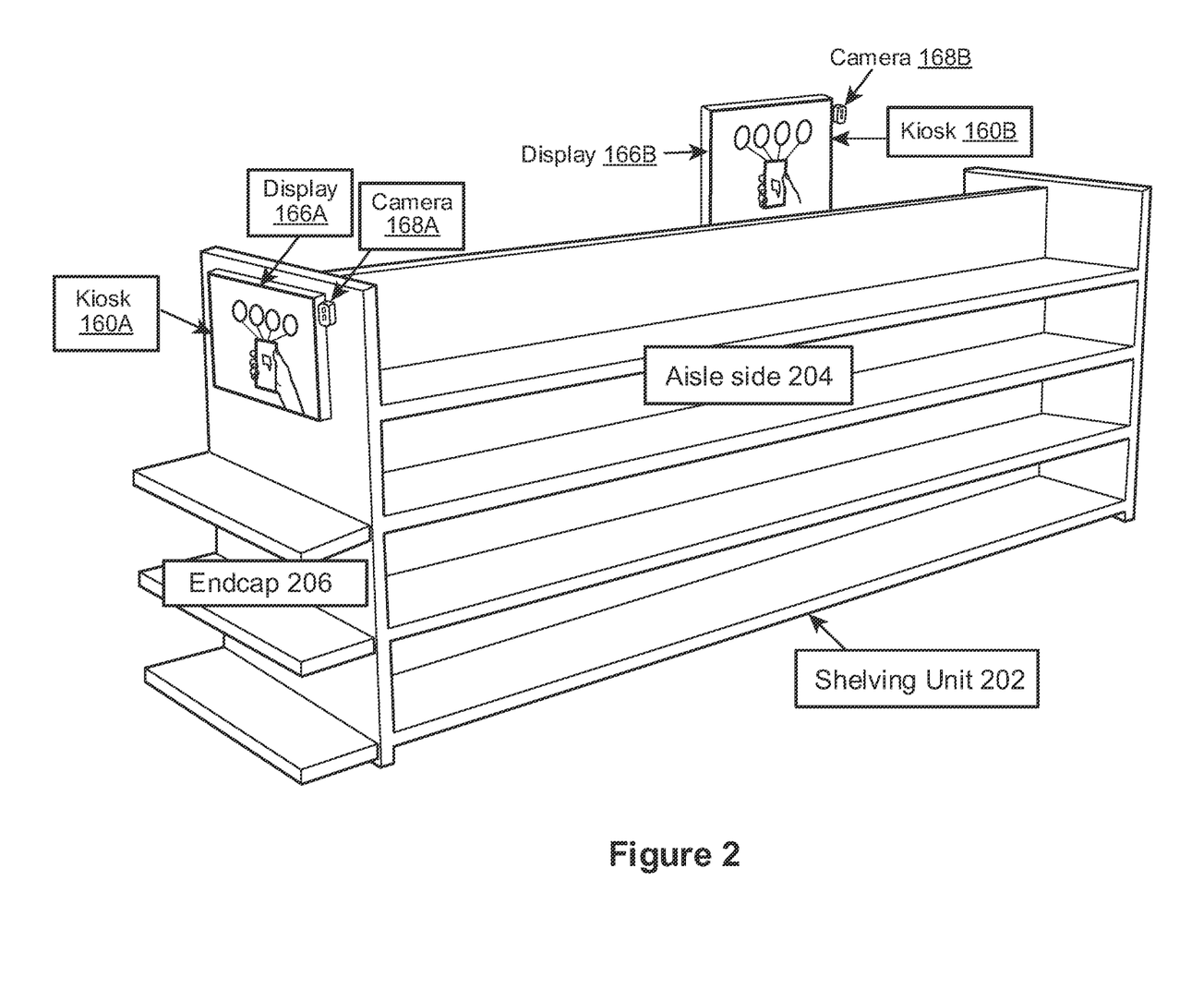
FIG. 2 illustrates an exemplary shelving unit including kiosks of the exemplary system depicted in FIG. 1, which may implement the techniques of this disclosure, in accordance with some embodiments.

FIG. 2 illustrates an example store environment 200, which may be located within the store 106, including a shelving unit 202. The store 106 may have several shelving units similar to the shelving unit 202, such that the shelving units form aisles within the store 106. The shelving unit 202 has several shelves along at least one aisle side 204 and at least one endcap 206. While not illustrated in FIG. 1, the shelving unit 202 may have shelves on a second aisle side and/or a second endcap.

The shelving unit 202 may include one or more kiosks, such as a kiosk 160A on the endcap 206, and a kiosk 160B on the aisle side 204. The kiosks 160A and 160B may be included within the store computing system 108. The kiosk 160A may include a display 166A and a camera 168A. Similarly, the kiosk 160B may include a display 166B and a camera 168B. In the embodiment depicted in FIG. 2, the displays 166A-B are touchscreens, but may alternatively comprise any other type of screen or other display and still fall within the scope of the disclosure. The cameras 168A-B can capture image and/or video data of customers in the aisles and/or near the endcaps of the store 106. As discussed below with reference to FIG. 3, the displays 160A-B may display notifications, alerts, and/or information in response to communications received from the store computing device 130 and/or the server 102. A customer may interact with the kiosks 160A-B by, for example, making selections via the displays 166A-B.

Figure 3:
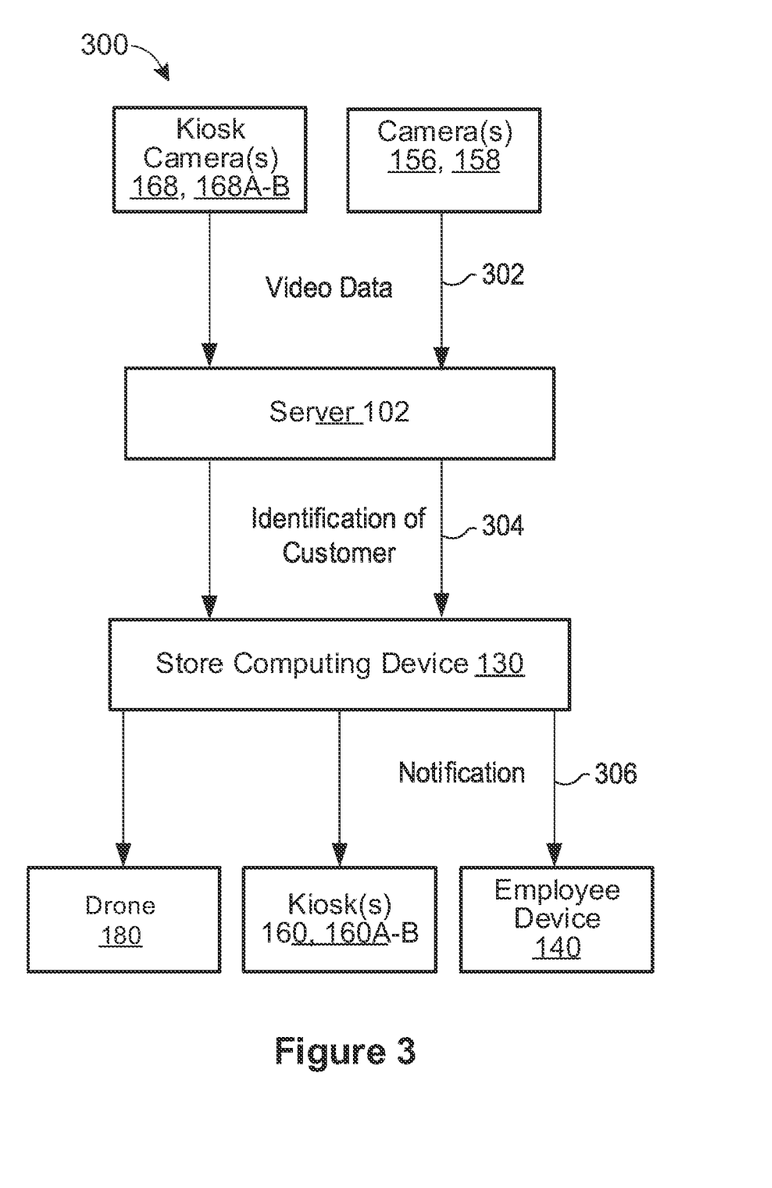
FIG. 3 illustrates a block diagram of an exemplary information flow through the devices of the exemplary system depicted in FIG. 1, in accordance with some embodiments.

FIG. 3 illustrates a block diagram of an exemplary information flow 300, in accordance with some embodiments. The cameras of the store computing system 108, such as the kiosk cameras 168 and 168A-B, the cameras 156 and 158 of the camera system 150, and/or a camera of the drone 180, may capture video data of customers in the store 106. Each camera 168, 168A-B, 156, 158 may continuously gather video data, or may capture video in response to an external trigger, such as a motion detector indicating that a customer is within view of the camera 168, 168A-B, 156, 158. The video data may also include indications of which camera 168, 168A-B, 156, 158 captured the data and/or the location of the camera 168, 168A-B, 156, 158. The kiosks 160, 160A-B and/or the camera system 150 can transmit 302 the video data to the server 102 for analysis.

Depending on the embodiment, the kiosks 160, 160A-B and/or the camera system 150 can transmit 302 the video data directly to the server 102, or to the server 102 via the store computing device 130. The server 102 may receive the video data at specified intervals (e.g., every 10, 20, 30, or 60 seconds). In some implementations, an image processing algorithm deployed at either the server 102 or the computing device 130 may determine whether the video data depicts a customer. For example, the image processing algorithm may utilize masking techniques or other object recognition techniques to identify a human in the video. The server 102 may pass the video data to the customer behavior application 120 if the video data includes a human, reducing unnecessary processing of video data that does not depict any customers.

The server 102 analyzes the video data to identify whether any customers depicted in the video data require assistance. The customer behavior application 120 of the server 102 can analyze the video data by, for example, applying the customer behavior model 122 to the video data.

The customer behavior model 122 may be a neural network, deep learning model, machine learning model, or other artificial intelligence model trained using training data from the database 118. Training the customer behavior model 122 may involve training the customer behavior model 122 to identify and recognize patterns in existing data, such as existing image and/or video data, in order to facilitate making predictions for subsequent data. For example, a gradient-based training algorithm (e.g., a stochastic gradient descent algorithm), supervised learning, unsupervised learning, reinforcement learning, or any other suitable training may be applied to train the customer behavior model 122.

Image processing techniques may also be used to extract features from image and video data. For example, image processing techniques may be used to extract customer locations and outlines from the data, as well as surroundings of the customer, such as products the customer may be located near. As another example, video features corresponding to customer movements are extracted from the video data. Accordingly, the customer behavior model 122 may be trained to identify image and/or video features and/or respective weights associated with the identified features. For example, the customer behavior model 122 may be trained to identify features indicative of customers in need of assistance. As another example, the customer behavior model 122 may be trained or configured to distinguish customers from employees by, for example, recognizing a uniform of the store 106.

In supervised machine learning, for example, the customer behavior model 122 may be trained using training data that includes both input video data and predetermined labels associated with the input video data. The labels map input to associated, or observed, outputs of the customer behavior model 122. This enables the customer behavior model 122 to determine or discover rules and relationships that map inputs to outputs, so that when subsequent novel inputs are provided (e.g., when the customer behavior model 122 is applied to video data of a customer in the store 106), the customer behavior model 122 can accurately predict the correct output. For instance, the customer behavior model 122 may be trained using video data with labels identifying customers that are frustrated or require assistance. The customer behavior model 122 can determine features, such as features indicative of customer movements, within the video data that correspond to such labels. Accordingly, the customer behavior model 122 is trained to discover mappings that predict, based on video data captured in the store 106, that a customer requires assistance.

In unsupervised machine learning, the customer behavior model 122 may be required to find its own structure in unlabeled example inputs. For example, the training video data may not be labeled as being indicative of a customer in need of assistance. Based on the training video data, the customer behavior model 122 identifies and evaluates image and/or video data features associated with customers in need of assistance. For example, the customer behavior model 122 may develop a feature that separates behaviors associated with "normal" customer behavior (e.g., typical or average as measured based on the training data), and behaviors that are different from "normal" (e.g., behaviors of customers that require assistance).

In some cases, the customer behavior model 122 may utilize a rules-based approach instead of or in addition to machine learning techniques. The customer behavior model 122 may comprise pre-determined rules associated with customer movements indicating customers in need of assistance. For example, a pre-determined rule may indicate that if video data includes a certain features or collection of features, then the customer depicted in the video data is in need of assistance.

Example customer movements that the customer behavior model 122 can identify are discussed below. These, however, are merely examples. If the customer behavior model 122 is trained, the customer behavior model 122 may discover additional customer movements associated with customers in need of assistance that are not listed above.

The customer behavior model 122 can identify body movements associated with customers in need of assistance. For example, the customer behavior model 122 may be configured to recognize video data depicting a customer pacing in an aisle for a predetermined amount of time. In one example, customer pacing may include walking back and forth at least a predetermined distance. In another example, customer pacing may include walking back and forth between two products or two locations. The customer behavior model 122 may be configured to identify a customer remaining in a store location or in an aisle for longer than a predetermined time period. In addition, the customer behavior model 122 may be configured to identify a customer leaving an aisle and returning to the aisle, which may indicate that the customer is looking for a particular item and/or is confused. If the model has access to the store data 136, the customer behavior model 122 can determine whether the customer is standing or pacing near a particular product or store location, such as a certain aisle, department, or locked area.

In addition to bodily movements (e.g., pacing, remaining in an aisle, leaving an aisle and returning), the customer behavior model 122 may also use facial recognition to identify facial movements and/or conditions indicating that a customer requires assistance. For example, the customer behavior model 122 may use emotional recognition techniques to determine customer facial movements indicating customers that are frustrated.

The customer behavior model 122 may use eye gaze tracking and/or eye gaze recognition to identify eye movements associated with a customer in need of assistance. For example, the customer behavior model 122 can determine whether a customer is gazing at a location for more than a predetermined amount of time or gazing between two locations for more than a predetermined amount of time. If the customer behavior model 122 has access to the store data 136, the customer behavior model 122 can determine whether a customer is gazing at a location where a product is out of stock, or gazing between locations associated with the same inventory category.

The customer behavior model 122 may also identify customer features, such as demographic information of the customer (estimated age, gender, race, etc.) or physical features of the customer (estimated hair color, clothes, etc). Further, the customer behavior model 122 may be trained to identify whether a customer is exhibiting physical symptoms of an illness or injury, such as coughing or limping.

Thus, the customer behavior application 120 applies the trained (or rules-based) customer behavior model 122 to the video data depicting customers in the store 106. The customer behavior model 122 can output an indication of whether any customers performed a customer movement associated with customers in need of assistance, and, if a customer in need of assistance is identified, output an identification of the customer to the customer behavior application 120.

Depending on the implementation and/or scenario, in addition to customer movements and/or customer information, the customer behavior model 122 may identify other store conditions and inform the store computing system 108 of the store conditions. For example, the customer behavior model 122 may be configured to identify liquid spills within an aisle, items on the floor, electrical problems, plumbing problems, or other hazards or anomalous conditions within a store environment. The customer behavior model 122 may be trained to identify such anomalous conditions, or may include pre-determined rules correlating video features with the anomalous conditions.

As depicted in FIG. 3, the server 102 transmits 304 the identification of the customer (or, in some cases, an identification of an anomalous condition in the store) to the store computing device 130. The identification of the customer may include a physical description of the customer based on the video analysis (e.g., blue shirt, blonde hair, etc.), a location of the customer, and/or an indication of the behavior the customer performed. The store computing device 130 may perform additional processing based on the customer identification. For example, the store computing device 130 may determine, based on the location of the customer and/or the behavior that the customer performed, that the customer requires assistance with a particular product and/or type of product. As a particular example, the server 102 may indicate that the customer is in need of assistance because the customer behavior model 122 identified the customer as standing within a particular location for longer than a period of time, or gazing at a particular location for longer than a period of time. The store computing device 130 can access the store data 136 and correlate inventory data with the video data and/or the output of the customer behavior model 122 to determine that the customer is near a particular product or type of products (e.g., pain relief medicine), or is gazing at a location where an item is currently out-of-stock. If the customer behavior model 122 identified the customer as gazing between two locations, the store computing device 130 can access the store data 136 to determine that the customer is having difficulty choosing between two products of the same or similar inventory category. As another example, if the customer behavior model 122 identified the customer as pacing or standing in an aisle, the store computing device 130 can access the store data 136 to determine that the customer requires assistance accessing a product in a locked case in the aisle. Depending on the implementation, some or all of this additional processing can take place at the server 102 if the server 102 has access to the store data 136.

Still referring to FIG. 3, the store computing device 130 can generate a notification tailored to assist the customer based on the information received from the server 102 and the additional processing. The store computing device 130 can transmit 306 the notification to the employee device 140, the drone 180, and/or one or more of the kiosks 160, 160A-B, as depicted in FIG. 3. For example, the store computing device 130 can generate a notification and transmit 306 the notification the employee device 140. The notification may include an instruction for a user (i.e., an employee) associated with the employee device 140 indicating that the user should initiate a customer service action to assist the customer. The notification may indicate what behavior the customer performed, the location of the customer (e.g., an aisle number or other store location indication), and/or an estimate of what the customer may require assistance with, based on the identification from the server 102 and/or the additional processing. For example, the notification may indicate that a customer in a specific aisle, such as aisle 5, is looking for an item is out of stock, requires help accessing a product that is locked, or requires help choosing between two different products. The notification may also indicate whether there are any sales or coupons associated with a product the appears to gazing at and/or located near.

Still referring to FIG. 3, the store computing device 130 may then transmit 306 the notification to a single employee device 140. For example, the store computing device 130 can determine based on the store data 136 that a particular employee is assigned to the aisle or department that the customer is located. The store computing device 130 may then transmit the notification to the employee device 140 of the particular employee. Alternatively, the store computing device 130 can transmit 306 the notification to multiple employee devices 140, such as to a group of employees assigned to the aisle or department where the customer is located or to all or several of the employees in the store. As another example, the store computing device 130 can transmit 306 the notification to one or more employee devices 140 associated with one or more store managers.

In cases where the store computing device 130 receives an indication of an anomalous condition in the store (e.g., a spill or other hazard), the store computing device 130 can transmit a notification to the employee device 140 including an indication of the type and location of the anomalous condition.

In addition, the display 146 of the employee device 140 can present the notification to a user of the employee device 140. The user can assist the customer or address the anomalous condition in accordance with the information and/or instruction included in the notification.

Additionally or alternatively, and as noted, the store computing device 130 can generate a notification and transmit 306 the notification to one or more of the kiosks 160 or 160A-B. Specifically, and in one example, the store computing device 130 can transmit the notification to a kiosk located closest to the customer's last known location, based on the video data, or to several kiosks in the vicinity of the customer. The store computing device 130 may transmit the notification to a kiosk including the camera that captured the video data depicting the customer. The notification may include information tailored to assist the customer based on the analysis by the model 122 and/or the results of the additional processing performed by the store computing device 130. As one example, the notification can include an indication that the customer may be looking for an item that is out of stock. The notification can include information related to the out-of-stock product, such as alternative products located in the store, other store locations where the product is available, and/or ordering information informing the customer how to place an order for delivery or store pick-up. As another example, the notification can include information related to an item the customer is gazing at and/or located near, or related to items that the customer appears to be choosing between. The notification can further include comparisons of the products, similar products, product descriptions, price comparisons, etc. In another example, if the customer behavior model 122 determines that the customer is exhibiting physical symptoms of an illness or injury, the notification may include a recommendation for an over-the-counter medicine or apparatus that would assist the customer. Further, the notification may include advertising materials based on products the customer appears to be gazing at or located near. The advertising materials may be selected based on customer demographic information identified by the customer behavior model 122.

The display 166 of the kiosk 160 can present the notification, and a nearby customer can view the notification. In some implementations, the display 166 may display a general alert such as, "Do you need help?". A customer can interact with the kiosk 160 via the user interface 167 to respond to the general alert. If the customer responds affirmatively, the kiosk 160 can display the tailored notification, and/or can display user-selectable menu options that a customer can interact with to access product information and/or coupons, contact an employee, and/or request assistance from a chatbot. The user can assist the customer in accordance with the information and/or instruction included in the notification.

Still referring to FIG. 3, in some implementations, the store computing device 130 may generate a notification and transmit 306 the notification to the drone 180. For example, the store computing device 130 can transmit the notification to a drone located near the customer of the customer's last known location, based on the video data. The notification may include a command for the drone 180 to initiate a customer service action to assist the customer. For example, the command may instruct the drone 180 to go to a particular location in the store, such as where the customer is located. The command may also include information that the drone 180 can display to customer on a display of the drone 180 to assist the customer. The drone 180 can move to the location of the customer and present the information, which may be similar to the notification that the display 166 of the kiosk 160 can present, as described above.

In some implementations, the store computing device 130 can generate notifications and transmit 306 a notification to any combination of the employee device 140, the drone 180, and one or more kiosks 160, 160A-B. For example, the store computing device 130 can transmit a notification to an employee device 140 that a customer requires assistance with a particular product or with unlocking a particular product, or and/or can transmit a notification to the drone 180 to move to a location near the customer and present information to assist the customer. The store computing device 130 can also transmit a notification to a kiosk 160 informing the customer that an employee, or drone, is on their way to assist the customer and/or including information concerning the product(s) the customer appears to require assistance with.

In some implementations, such as those in which the server 102 performs the additional processing discussed above, the server 102 can generate the notification and directly transmit the notification to the kiosks 160, 160A-B, the drone 180, and/or the employee device 140. It will be understood that any notification described above relative to one of the kiosks 160, 160A, 160B or the drone 180 may also be provided to the employee device 140. Likewise, any notification type described above relative to the employee device may alternatively and/or additionally be provided to one of more of the kiosks 160, 160A, 160B or the drone 180.

Figure 4:
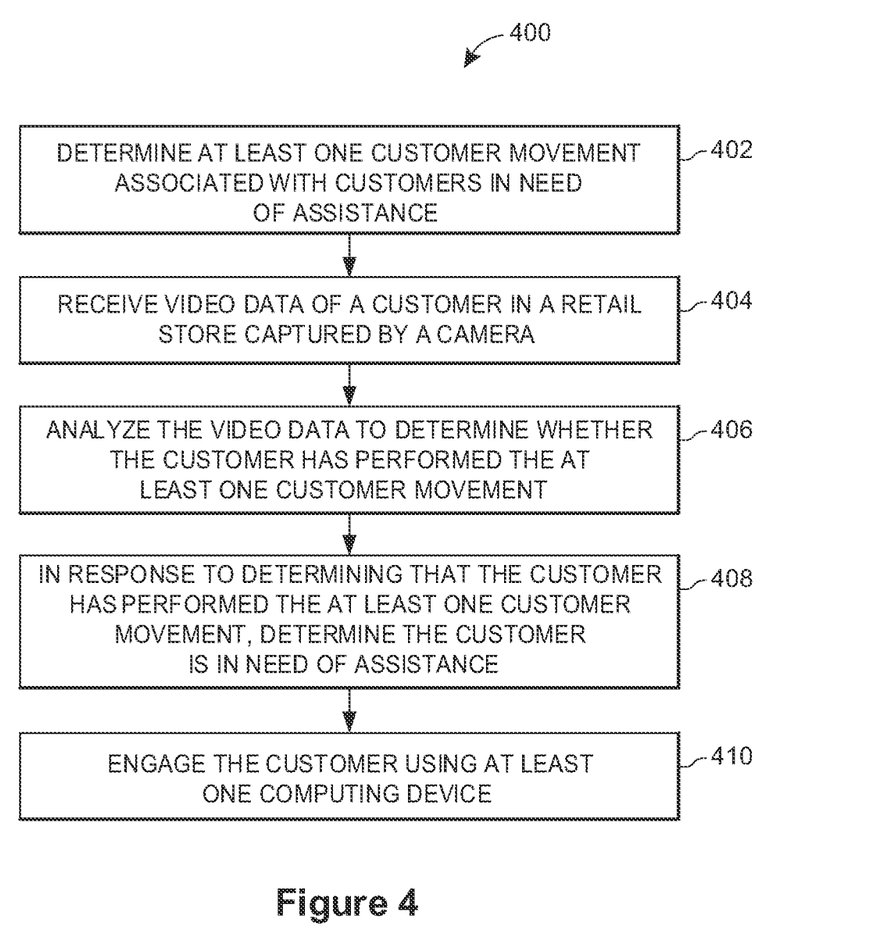
FIG. 4 illustrates a flow diagram of an exemplary method for automatically initializing customer assistance based on video analysis, in accordance with some embodiments.

FIG. 4 illustrates a flow diagram of an exemplary method 400 for automatically initializing customer assistance based on video analysis, in accordance with some embodiments. The method 400 can be implemented as a set of instructions stored on a computer-readable memory and executable on one or more processors. For ease of explanation, the discussion below may refer to the server 102 as performing the steps of the method 400, but the method 400 can be implemented by any component of the server 102 and/or one or more devices of the system 100 of FIG. 1.

Referring first to block 402, the server 102 may determine at least one customer movement associated with customers in need of assistance. As discussed above with reference to FIG. 3 and below with reference to FIG. 5, the server 102 may determine such movements by training the customer behavior model 122 to identify such movements. In other embodiments, such as the example depicted in FIG. 4, the server 102 may not train customer behavior model 122. The server 102 may receive pre-determined rules associated with customer movements indicating customers in need of assistance. For example, a pre-determined rule may indicate that if video data includes a certain features or collection of features, then the customer depicted in the video data is in need of assistance.

At block 404, the server 102 receives video data of a customer in the store 106. The server 102 can receive video data captured by the camera 168 of the kiosk 160, or by the cameras 156-158 of the camera system 150. Next, at block 406, the server 102 analyzes the video data to determine whether a customer depicted in the video data performs one or more movements associated with customers in need of assistance. In one example, the server 102 may analyze the video data by combining video data from multiple cameras of the store computing system 108. The server 102 may analyze the video data by applying the customer behavior model 122 to the video data according to any one or more techniques described above relative to the customer behavior model 122. In addition, the customer behavior model 122 can identify whether the customer depicted in the video is performing movements indicating the customer requires assistance, as also explained above.

At block 408, in response to determining that the customer has performed at least one customer movement associated with customers in need of assistance, the server 102 determines that the customer requires assistance. In response to the determination, at block 410, the server 102 engages the customer using at least one computing device. For example, the server 102 may cause one or more of the kiosks 160, 160A-B, the drone 180, or the employee device 140 to display a notification tailored to the customer, as described above. The server 102 can transmit a customer identification to the store computing device 130, which can then generate the notification and transmit the notification to the kiosks 160, 160A-B, the drone 180, or the employee device 140, or the server 102 can transmit a notification directly to the kiosks 160, 160A-B, the drone 180, or the employee device 140.

Figure 5:
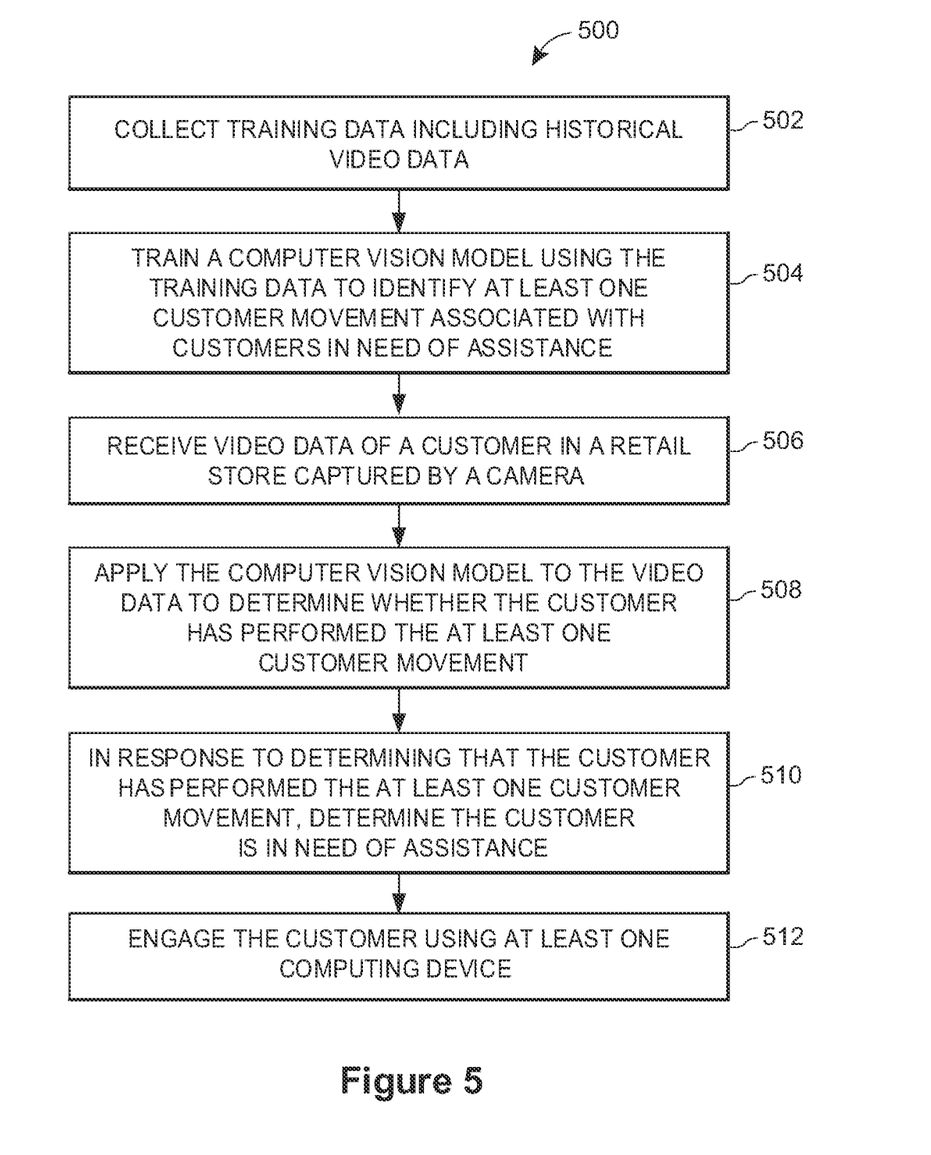
FIG. 5 illustrates a flow diagram of another exemplary method for automatically initializing customer assistance based on video analysis, in accordance with some embodiments.

FIG. 5 illustrates a flow diagram of another exemplary method for automatically initializing customer assistance, in accordance with some embodiments. The method 500 can be implemented as a set of instructions stored on a computer-readable memory and executable on one or more processors. For ease of explanation, the discussion below may refer to the server 102 as performing the steps of the method 500, but the method 500 can be implemented by any component of the server 102 and/or one or more devices of the system 100 of FIG. 1.

Referring first to block 502, the server 102 can collect training data including historical video data, such as training data from the database 118. The historical video data may be captured by cameras within retail stores. Some or all of the historical video data may be captured by the cameras 156-158, 168, 168A-B of the store computing system 108, or other cameras in similar systems of other retail stores. At block 504, the server 102 trains a computer vision model, such as the customer behavior model 122, to identify at least one customer movement associated with customers in need of assistance, as described above.

At block 506, the server 102 receives video data of a customer in a retail store captured by a camera. For example, the server 102 may receive video data of a customer in the store 106 captured by one or more of the cameras 156-158, 168, 168A-B. At block 508, the server 120 applies the computer vision model to the video data to determine whether the customer has performed the at least one customer movement, according to any one or more techniques described above relative to the customer behavior model 122. In response to determining that the customer has performed the at least one customer movement, the server 102 at block 510 determines that the customer is in need of assistance. Next, at block 512, the server 102 engages the customer using at least one computing device, in a manner similar to block 410.

In view of the foregoing, it will be appreciated that the foregoing systems and methods include many advantages. For example, the systems and methods of the present disclosure include a computer system configured to analyze video data to automatically identify customers in need of assistance in a retail store and engage such customers accordingly. By automatically identifying and engaging customers requiring assistance, the disclosed systems and methods improve the in-store experience for customers and increase the probability that the customer will make a purchase at the retail store and/or return to the retail store. Further, the systems and methods of the present disclosure enable a computer system to automatically identify both customers in need of assistance and anomalous conditions in a store, such as hazardous spills, thereby improving in-store monitoring technologies.

Additional Considerations

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A method for automatically initializing customer assistance in a retail store based on video analysis, the method comprising:
   collecting, by one or more processors, training data including video data;
   analyzing, by the one or more processors, the training data using an image processing algorithm to extract patterns from the training data, wherein the extracted pattern contains a feature corresponding to a customer behavior;
   training, by the one or more processors, a computer vision model by applying an artificial intelligence technique to the training data to identify at least one customer behavior associated with customers in need of assistance in the retail store;
   receiving, at the one or more processors, video data of a customer in the retail store captured by a camera;
   applying, by the one or more processors, the computer vision model to the captured video data to predict the customer is in need of assistance at a particular location in the retail store based on the customer's behavior;
   identifying, by the one or more processors, based on the prediction that the customer is in need of assistance, a customer location in the retail store;
   determining, by the one or more processors, one or more products in proximity to the customer that are tailored to the customer based on the customer's behavior; and
   sending, by the one or more processors, a notification to a computing device of a customer service representative, the notification directing the customer service representative to the location of the customer in need of assistance, and providing in the notification information related to one or more products tailored to the customer.

2. The method of claim 1, wherein sending a notification to a computing device of a customer service representative includes displaying information on a display of the customer service representatives computing device, the information related to one or more products tailored to the customer in need of assistance.

3. The method of claim 2, wherein sending the notification to the computing device includes
   sending a notification to a mobile device of an employee of the retail store.

4. The method of claim 1, wherein training the computer vision model to identify the at least one customer behavior includes:
   training the computer vision model to identify a body location pattern associated with customers in need of assistance, wherein the body location pattern includes at least one of: (i) the customer remaining in an aisle of a store for more than a predetermined amount of time, (ii) the customer remaining in a location of a store for more than a predetermined amount of time, (iii) the customer leaving an aisle of a store and returning to the aisle, or (iv) the customer pacing within an aisle of a store for more than a predetermined amount of time.

5. The method of claim 1, wherein training the computer vision model to identify the at least one customer behavior further includes:

training the computer vision model to identify a facial movement associated with customers in need of assistance.

6. The method of claim 5, wherein training the computer vision model to identify the facial movement includes:
training the computer vision model to recognize an eye gaze movement, wherein the eye gaze movement is selected from at least one of: (i) the customer gazing at a location for more than a predetermined amount of time; (ii) the customer gazing between two locations for more than a predetermined amount of time; (iii) the customer gazing at a location where a product is out of stock; and (iv) the customer gazing between a first location associated with a first product of an inventory category and a second location associated with a second product of the inventory category.

7. The method of claim 1, further comprising:
receiving, at the one or more processors, inventory data of the retail store; and
correlating, by the one or more processors, the captured video data to the inventory data to determine one or more products with which the customer is in need of assistance.

8. A system for automatically initializing customer assistance in a retail store based on video analysis, the system comprising:
one or more processors; and
a non-transitory computer-readable memory coupled to the one or more processors, the memory storing instructions thereon that, when executed by the one or more processors, cause the one or more processors to:
collect training data including video data;
analyze the training data using an image processing algorithm to extract patterns from the training data, wherein the extracted pattern contains a feature corresponding to a customer behavior;
train a computer vision model by applying an artificial intelligence technique to the training data to identify at least one customer behavior associated with customers in need of assistance in the retail store;
receive video data of a customer in the retail store captured by a camera;
apply the computer vision model to the captured video data to predict the customer is in need of assistance at a particular location in the retail store based on the customer's behavior;
identify, based on the prediction that that customer is in need of assistance, a customer location in the retail store;
determine, based on the customer's behavior, one or more products in proximity to the customer that are tailored to the customer; and
send a notification to a computing device of a customer service representative, the notification directing the customer service representative to the location of the customer in need of assistance, and providing in the notification information related to one or more products tailored to the customer.

9. The system of claim 8, wherein the instructions, when executed, cause the one or more processors to:
send a notification to a computing device of a customer service representative;
direct, via the notification, the customer service representative to the location of the customer in need of assistance; and
provide, in the notification, information related to one or more products tailored to the customer.

10. The system of claim 9, wherein the computing device is a mobile device.

11. The system of claim 8, wherein the instructions, when executed cause the one or more processors to:
train the computer vision model to identify a body location pattern associated with customers in need of assistance, wherein the body location pattern includes at least one of: (i) the customer remaining in an aisle of the retail store for more than a predetermined amount of time, (ii) the customer remaining in a location of the retail store for more than a predetermined amount of time, (iii) the customer leaving an aisle of the retail store and returning to the previous aisle, and (iv) the customer pacing within an aisle of the retail store for more than a predetermined amount of time.

12. The system of claim 8, wherein the instructions, when executed, cause the one or more processors to:
train the computer vision model to identify a facial movement associated with customers in need of assistance.

13. The system of claim 12, wherein the facial movement is an eye gaze movement selected from at least one of: (i) the customer gazing at a location for more than a predetermined amount of time; (ii) the customer gazing between two locations for more than a predetermined amount of time; (iii) the customer gazing at a location where a product is out of stock; and (iv) the customer gazing between a first location associated with a first product of an inventory category and a second location associated with a second product of the inventory category.

14. A tangible machine-readable medium comprising instructions for automatically initializing customer assistance in a retail store based on video analysis that, when executed, cause a machine to at least:
collect training data including video data;
analyze the training data using an image processing algorithm to extract patterns from the training data, wherein the extracted pattern contains a feature corresponding to a customer behavior;
train a computer vision model by applying an artificial intelligence technique to the training data to identify at least one customer behavior-associated with customers in need of assistance in the retail store;
receive video data of a customer in the retail store captured by a camera;
apply the computer vision model to the captured video data to predict the customer is in need of assistance at a particular location in the retail store based on the customer's behavior;
identify, based on the prediction that that customer is in need of assistance, a customer location in the retail store;
determine, based on the customer's behavior, one or more products in proximity to the customer that are tailored to the customer; and
send a notification to a computing device of a customer service representative, the notification directing the customer service representative to the location of the customer in need of assistance, and providing in the notification information related to one or more products tailored to the customer.

15. The tangible machine-readable medium of claim 14, wherein the instructions, when executed further cause the one or more processors to:

send a notification to a computing device of a customer service representative;

direct, via the notification, the customer service representative to the location of the customer in need of assistance; and provide, in the notification, information related to one or more products.

16. The tangible machine-readable medium of claim 14, wherein the computing device is a mobile device.

17. The tangible machine-readable medium of claim 14, wherein the instructions, when executed further cause the one or more processors to:

train the computer vision model to identify a body location pattern associated with customers in need of assistance, wherein the body location pattern includes at least one of: (i) the customer remaining in an aisle of the retail store for more than a predetermined amount of time, (ii) the customer remaining in a location of the retail store for more than a predetermined amount of time, (iii) the customer leaving an aisle of the retail store and returning to the previous aisle, and (iv) the customer pacing within an aisle of the retail store for more than a predetermined amount of time.

18. The tangible machine-readable medium of claim 14, wherein the instructions, when executed further cause the one or more processors to:

train the computer vision model to identify a facial movement associated with customers in need of assistance.

19. The tangible machine-readable medium of claim 18, wherein the facial movement is an eye gaze movement selected from at least one of: (i) the customer gazing at a location for more than a predetermined amount of time; (ii) the customer gazing between two locations for more than a predetermined amount of time; (iii) the customer gazing at a location where a product is out of stock; and (iv) the customer gazing between a first location associated with a first product of an inventory category and a second location associated with a second product of the inventory category.

* * * * *